Dec. 7, 1965 A. OSBORNE 3,221,541
METHOD OF AND APPARATUS FOR ACCURATELY AND INSTANTANEOUSLY
DETERMINING THE RATIO OF THE CONSTITUENTS OF A
VAPOR-LIQUID-SOLID MIXTURE OR A MIXTURE OF
ANY TWO OF THE COMPONENTS THEREOF
Filed Dec. 20, 1961 4 Sheets-Sheet 1
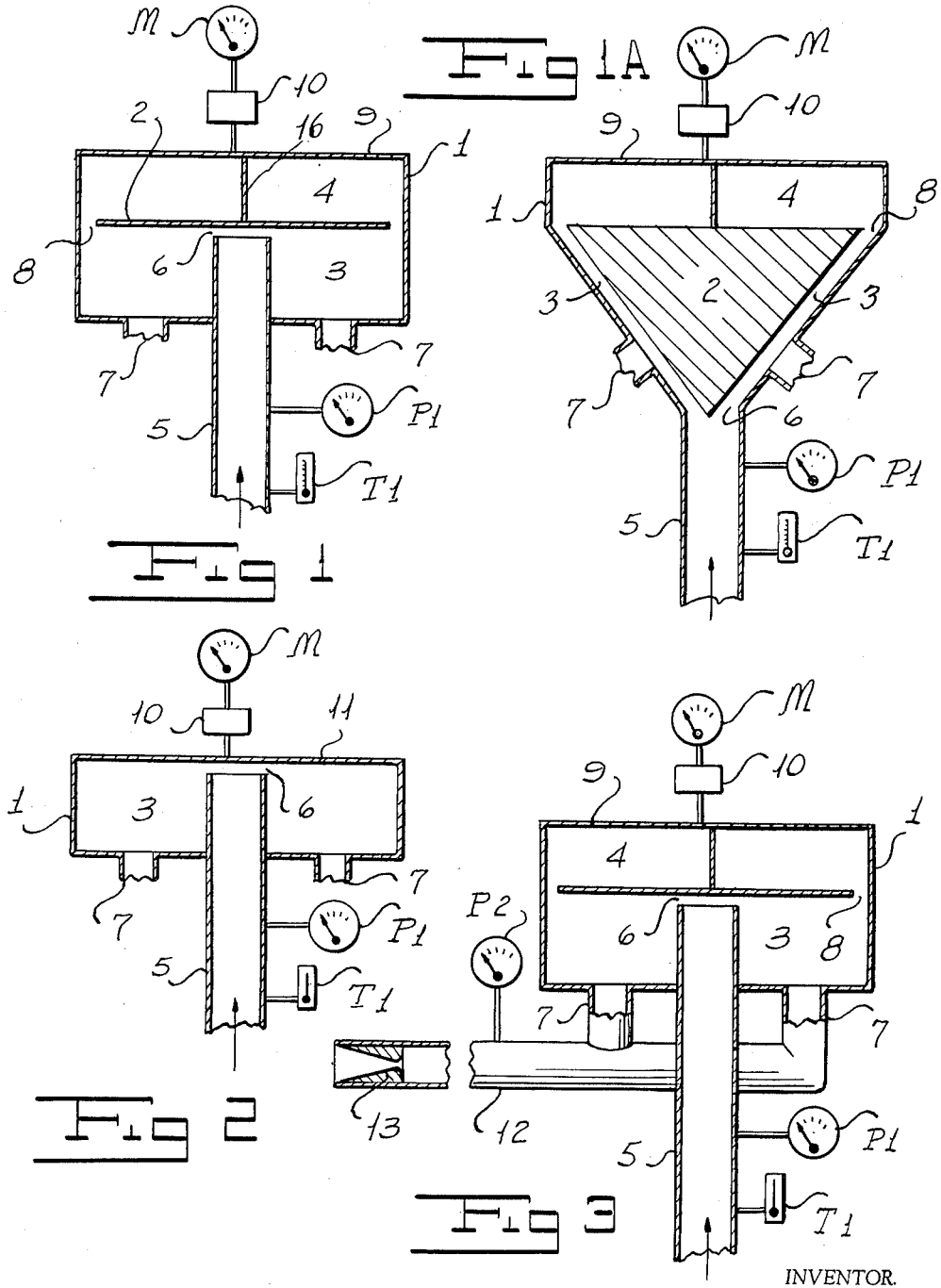
INVENTOR.
ADAM OSBORNE
BY
ATTORNEY

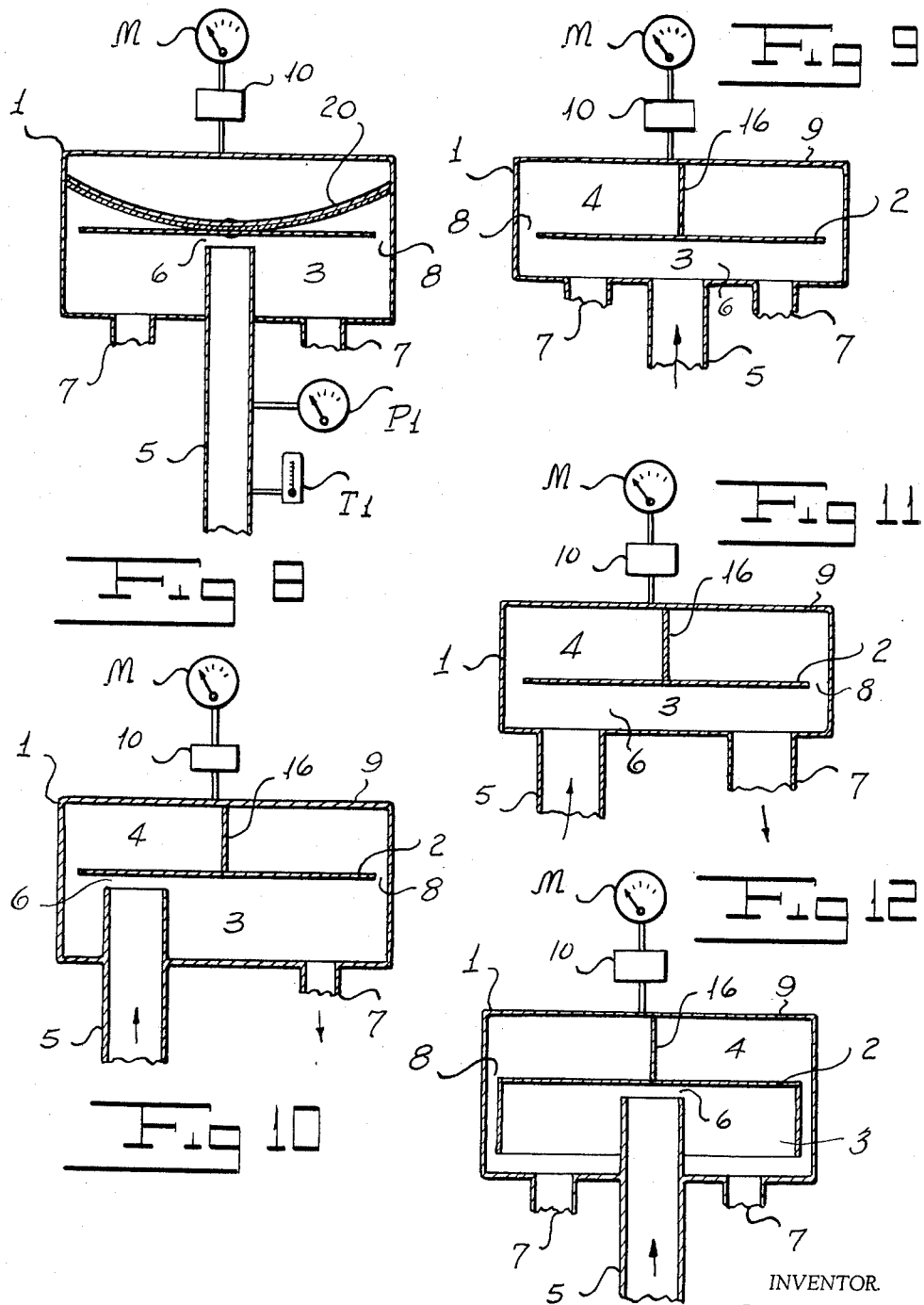

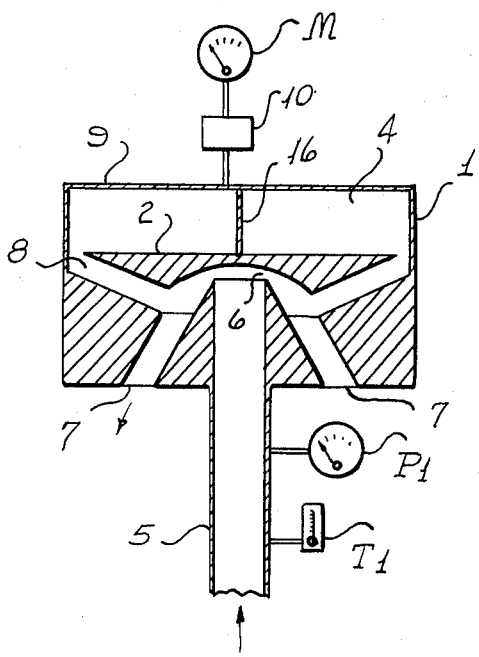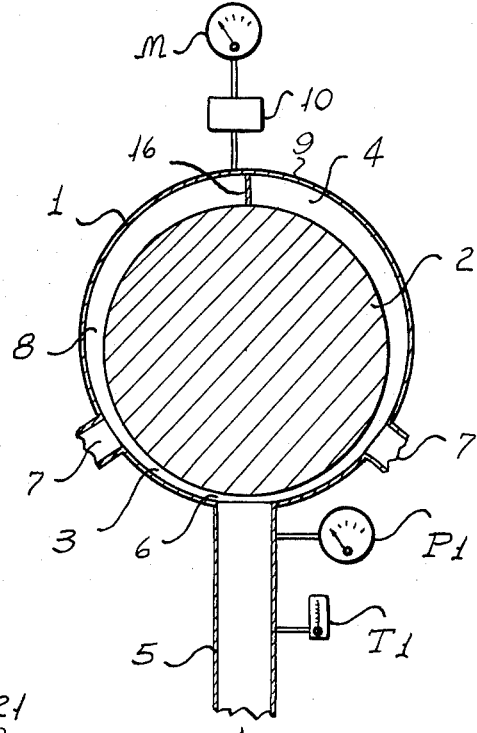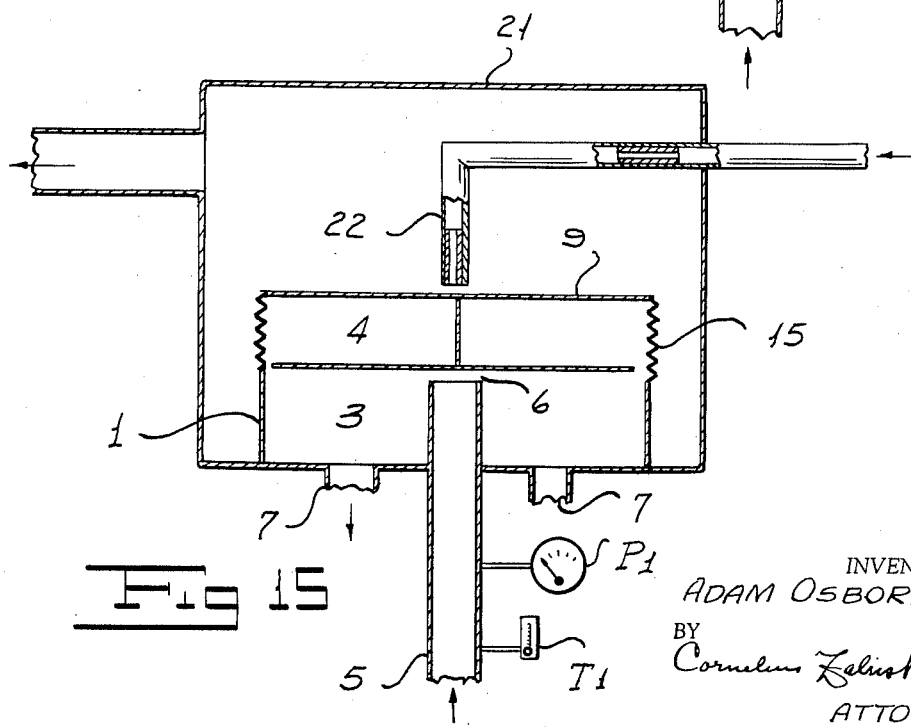

United States Patent Office 3,221,541
Patented Dec. 7, 1965

3,221,541
METHOD OF AND APPARATUS FOR ACCURATE-
LY AND INSTANTANEOUSLY DETERMINING
THE RATIO OF THE CONSTITUENTS OF A
VAPOR-LIQUID-SOLID MIXTURE OR A MIX-
TURE OF ANY TWO OF THE COMPONENTS
THEREOF
Adam Osborne, Bethlehem, Pa., assignor to Entroputers, Inc., New York, N.Y., a corporation of New York
Filed Dec. 20, 1961, Ser. No. 160,829
18 Claims. (Cl. 73—53)

This invention is a method of and apparatus for accurately and instantaneously determining the ratio of the phases constituents of a vapor-liquid-solid mixture or a mixture of any two of the components thereof, with the additional advantage of the determination of mass flow rate.

The methods available prior to this invention for determining phase equilibrium data or phase ratio data are extremely limited in their application and the results obtained from the use thereof vary over wide limits from the standpoint of accuracy and speed of determination. They are invariably based upon the principles of calorimetry which, experience has shown, do not meet practical requirements, more especially where unsteady conditions prevail.

The object of the present invention is to provide a method and apparatus which will precisely determine and give the information desired in a simple, substantially instantaneous manner and continuously where such information is desired. This result cannot be obtained by calorimetric apparatus or methods.

The invention is adapted for wide fields of usage, such, for example, as the following:

(a) *Quality metering.*—When a liquid boils it is changed from liquid to vapor phase without change in temperature. It is often desirable to know how far this change has proceeded. For example, steam is generated in boilers and sold to consumers or used directly for a number of purposes. Boilers are rated by the quantity of dry steam generated and the steam is sold by weight of dry steam. It would therefore be very useful to be able to make quick, accurate checks on the amount of moisture present in the steam.

Furthermore it is well recognized that small quantities of moisture or liquid in steam or vapor have a highly corrosive effect upon apparatus in which the same is utilized, such, e.g., as in turbines, steam systems and the like. The ability to determine the presence of such moisture or liquid in very small quantities in inaccessible regions of equipment can permit such adjustments as will prevent or minimize any damage that might be caused by the presence thereof.

In scientific work it is often necessary to measure the amount of vapor in conjunction with its liquid phase, from 0% to 100% vapor. There is at present no means of quickly or continuously obtaining this measurement.

It is also very difficult to measure the mass flow rate of mixtures of liquid and vapor as described above.

The present invention provides for the accurate, quick and continuous determination of all the information desired in the field of quality metering and flow rate measurement.

(b) *Vapor-liquid data.*—Where mixtures of liquids are boiled, such as in distillation processes, it is advantageous to be able to measure the vapor-liquid weight ratios at any point, e.g., to investigate channeling effect, or efficiencies, or as a means of controlling a distillation column.

It is also highly desirable to be able to measure liquid hold up or carry over in vapor streams, either caused by wetness of a vapor or caused by a liquid and a vapor flowing together through a pipe. There is no means heretofore known for quickly or continuously obtaining this measurement.

Here also the mass flow rate of mixture at any point may be determined according to this invention.

(c) *Detection of solids.*—It is impossible under previously known practice to measure the solids density in a gas or liquid, with speed or accuracy. This instrument may be employed to make such measurements, for example, the dust content in a cyclone effluent or the dust content in an air space where there is a static electricity hazard. Another use of this invention is measurement of solids in a sedimeter overflow.

The present invention may be utilized, per se, for the determination of any of the information appropriate to the fields of usage (a), (b) or (c), or it may be utilized in conjunction with or as an accessory to or as part of otherwise independent equipment to cooperate therewith as an automatic controller, as hereinafter described, or in conjunction therewith as an analyzer to give information relative to chemical compositions and vapor-liquid ratios of mixtures, either static in or flowing through such other equipment.

UNDERLYING PRINCIPLES OF THIS INVENTION

Generally stated, instruments according to this invention utilize the thermodynamic properties of liquids and vapors, to determine the data hereinbefore stated.

To obtain such data the pressure and temperature of the influent is measured together with the pressure or temperature of the effluent. A further pressure or temperature, called the phase sensitive pressure or temperature, hereinafter to be described, is measured, and it is found that this pressure or temperature M is a function of the phase-ratio relation of the components of the influent, as given in the following equation:

*Equation I*

$$M = P_1 T_1 f\left[\frac{T_1 S_1}{P_1 V_1}\right]$$

wherein $P_1$ = Pressure of influent
$T_1$ = Temperature of influent
$S_1$ = Entropy of influent
$V_1$ = Specific volume of influent The form of the function varies and depends on the design of the instrument but obviously is a constant for any given instrument.

A common form of Equation I is given in the following equation:

*Equation II*

$$P_s = C_1 + C_2 P_1 \left[\frac{P_1 V_1}{T_1 S_1}\right]^{C_3}$$

wherein $P_s$ = the phase sensitive pressure
$C_1$–$C_3$ are constants since $V_1$ and $S_1$ are functions of $P_1$, $T_1$ and $X$, where $X$ represents the vapor-liquid-solid data, and are functions of no other variables, it is possible to write the following equation:

*Equation III*

$$X = f(P_s T_1 P_1)$$

wherein X represents percent liquid in vapor or percent solid in vapor or percent solid in liquid.

As stated above, the function $f$ depends on the design of the instrument, but is constant for a given influent temperature $T_1$ and pressure $P_1$. With a temperature $T_1$ and pressure $P_1$ being held constant, X, the quality, is determined as shown in Equation III by measuring the conversion pressure $P_s$. It is apparent from an analysis of the description above, that the apparatus be constructed and consequently that $f$ be a function such that slight changes in the quality X will produce a significant change in the conversion pressure $P_s$. As explained hereafter in the description of the operation of the apparatus of FIG. 1, for example, the change in $P_s$ is communicated to a suitable recording station and the reading correlated with known data to provide a determination of the quality X. For example, if X represents steam quality, it is desirable that $f$ be a function such that a small change in X, the steam quality, correspond to the largest possible change in $P_s$, the conversion pressure. In order to obtain optimum apparatus configuration or construction, influents, at a fixed temperature and pressure and different known qualities, are fed into instruments of varying configurations, and by a process of trial and error, the configuration is found for which a small, known and fixed change in quality produces the maximum change in conversion pressure. It is beieved that the state of the art of the theoretical fluid mechanics of multiphase systems is at the present time inadequate to determine in any way the nature of the function $f$, such that the function $f$ could be used as a guide toward designing an instrument. The function $f$ serves only to lend meaning to the process of trial and error optimization of the design of the instrument as hereinbefore stated, and hereinafter considered more fully. Apparatus suitable for use with the method of this invention is described hereafter. However, the method may be carried out in apparatus having configurations differing from that shown herein.

*Equation IV*

$$X = f(T_s T_1 P_1)$$

wherein $T_s$ = phase sensitive temperature.

I have also discovered that flow rate of a mixture can be measured by the following equation, to wit:

*Equation V*

$$Q = f\left(P_s, \frac{P_1 V_1}{T_1 S_1}\right)$$

wherein $Q$ = mass flow rate.

The form of the function varies and depends on the design of the instrument.

The method of this invention comprises the following fundamental steps, namely:

(a) Causing an influent to be introduced into a dynamic chamber through an inlet opening, the velocity will at all times be characteristic of the phase-ratio of the components of the influent; the nature of the characteristic relationship will depend on the area of the inlet orifice, (b) Directing a portion of said influent in the dynamic chamber into cooperative relation with a pressure or temperature responsive conversion chamber or element to produce measurable energy in the latter while venting other portions of such influent from said dynamic chamber, and (c) And applying the resulting measurable energy in or of conversion chamber or element to appropriate pressure or temperature responsive mechanism to indicate the characteristics of the influent.

Features of the invention, other than those adverted to, will be apparent from the hereinafter detailed description and appended claims, when read in conjunction with the accompanying drawings.

The invention may be carried out in practice by the use of different forms of apparatus, exemplary forms of which are shown in the accompanying drawings, but the showings therein made are to be understood as illustrative, only, and not as defining the limits of this invention.

FIGS. 1–14, inclusive, schematically show different illustrative forms of which this invention may partake.

FIG. 15 shows a device embodying the present invention built into another apparatus which has its own particular function.

Referring first to FIG. 1 of the drawings which diagrammatically shows apparatus for carrying out this invention, 1 designates any appropriate housing, provided interiorly with a partition 2 which divides the interior of the housing into a dynamic chamber 3 and a conversion chamber 4 which constitutes one form of conversion chamber. A post 16 rigidly supports the partition 2 from the top wall 9 of the housing.

Leading into the dynamic chamber 3 is an influent passage 5 which, as shown in this figure, terminates in close proximity to the partition 2, but is spaced therefrom to provide an intermediate constricted orifice 6. The dynamic chamber 3 is vented to the atmosphere through one or more vents 7.

It is to be understood that the housing 1 may be of any desired shape and the same is true of the partition 2. Likewise the orifice 6 may be formed by closely spacing the end of the influent passage from the partition 2 or may comprise perforations or other openings in the wall of the passage 5 or a change of cross sectional area as shown in FIG. 1A, wherein the partition 2 is of substantially inverted conical form to provide a relatively constricted passage between it and the tapering wall of the housing 1.

Since the orifice 6 is constricted in character and the dynamic chamber 3 is vented at 7, it necessarily follows that the pressure in the chamber 3 is less than the pressure in the inlet 5 and consequently the influent will be expanded as it enters the chamber 3. In the form of the invention shown in FIG. 1A the passage 3 would constitute the dynamic chamber. From this fact it will be apparent that the shaping of the respective parts of the apparatus may vary widely without departing from this invention.

Between the dynamic chamber 3 and the conversion chamber 4 is one or more openings. In FIG. 1, one opening, designated 8, is peripherally of the partition 2, although, in practice, the same results may be obtained by providing the partition 2 with perforations, slots or other openings so that there is communication established between the chambers 3 and 4. In FIG. 1A the spacing of the conical partition 2, at 8, from the lateral wall of the housing 1 serves as the access opening between the dynamic and conversion chambers.

The top wall 9 of the conversion chamber 4 has associated therewith any appropriate form of detection device 10 which, in practice, may vary widely. For example, the device 10 may be an electric circuit controlling a thermocouple, a capillary tube for the transmission of pressure, or any other pressure or heat sensitive element, or the like. In any event, the function of this device 10 is to operate an apppropriate mechanism M whereby visual, audible, or recording data may be obtained for translating the conditions within the apparatus into definite information respecting the operations performed by the conversion chamber. The indicating mechanism M may be in the form of a pointer moving over a dial, as shown, or any other registering device, such as an inking stylus acting on a movable chart. In fact it may be any device which will provide the indications referred to. There is also associated with the influent passage 5 a pressure indicator $P_1$ and a temperature indicator $T_1$.

Influent, the particulars of which are to be indicated, is fed from its source to and through the influent passage 5 to the orifice 6, as shown in FIG. 1, from which it passes into the dynamic chamber 3. The same operation is carried out in connection with the form of the invention shown in FIG. 1A. There some of the influent, thus introduced into the chamber 3, passes through the opening 8 into the conversion chamber 4. The excess influent from the chamber 3 passes through the vents 7, either to the atmosphere or back to the source of influent.

Influent passing from the influent passage 5 to the dynamic chamber 3 undergoes a thermodynamically irreversible expansion across the orifice 6, with the result that there is some loss in total energy content of the influent. Thus by measuring the energy loss across the orifice 6, the phase condition of the influent may be determined by comparing the measured energy loss with a predetermined relationship between energy loss and influent phase condition. Since the velocity of the influent in the inlet passage 5 is small, substantially all the energy of the influent in the inlet passage 5 is in the form of measurable potential energy, and may be measured as a function of the influent phase condition by measuring the temperature and pressure of the influent. Relatively, all the fluid in the dynamic chamber will have a considerable velocity, and the total energy of the fluid therein is made up of potential energy which can be measured, as in the inlet passage 5, and kinetic energy due to the velocity of the fluid, which cannot be measured. A portion of the fluid in the dynamic chamber 3 is therefore introduced through the opening 8 into the conversion chamber 4. Since the conversion chamber 4 has an opening or openings 8 to allow flow substantially in only one direction, the conversion chamber is substantially a no flow chamber, that is, the fluid in the conversion chamber is substantially at rest. Therefore the flow through the opening or openings 8 is thermodynamically almost reversible, and the total energy of the fluid in the conversion chamber will be substantially equal to the total energy of the fluid in the dynamic chamber. Since the conversion chamber is a no flow chamber, the energy of the fluid in the conversion chamber is substantially all potential energy, which may be measured as for the influent in the inlet passage 5. Thus by measuring the energy loss of the fluid between the inlet passage 5 and the conversion chamber 4, the phase condition of the influent may be inferred as hereinbefore described for the energy loss across the inlet orifice 6, as hereafter to be described in greater detail. After flowing through the inlet orifice 6, the fluid will undergo further energy losses in the dynamic chamber 3, for example, the pressure will fall horizontally across the outlet ports 7. However, such losses are taken into consideration when a predetermined relationship between energy loss and influent phase condition is used as the basis of measuring influent phase condition. Thus, it is found in practice that it is only necessary to measure the difference between the influent pressure and the conversion chamber pressure, or the influent temperature and the conversion chamber temperature, and this difference may be correlated successfully as a function of the influent phase condition, when the influent pressure and temperature are not varying. It is also found that as hereinbefore described in connection with Equation III, the size of the inlet orifice 6 is very important in obtaining the largest change in the conversion chamber pressure or temperature for a fixed change in the influent phase condition. For example, it is found in practice that where the influent is a mixture of steam and water, the orifice 6 should be formed in an instrument as illustrated in FIG. 1 by placing the partition 2 very close to the top of the influent passage 5. Additionally, measurement of the phase sensitive pressure or phase sensitive temperature alone can be correlated to the quality of the influent phase by simply relating the measurement of these variable against prerecorded values of same, which correlate to specific phase conditions for the material measured.

The resulting measurable characteristic pressure or temperature evolved in the conversion chamber then acts through the detection device 10 upon the mechanism M which functions as an indicator or registering device. In the meantime the temperature and pressure of the influent flowing through the influent passage 5 are registered by the temperature and pressure indicators $T_1$ and $P_1$ associated with said passage.

The readings obtained from the instruments or devices M, $T_1$ and $P_1$ are the basis for the Equations I, II and III, hereinbefore given. The apparatus is so calibrated that the reading at the instrument M will indicate an accurate determination of the perecntage or ratio of vapor, liquid, or other extraneous material in the influent according to the particular information which is desired in this connection. The resulting reading at the instrument M will primarily depend upon the particular conditions in the influent when such conditions correspond to the readings indicated at $P_1$ and $T_1$.

Each instrument of the present invention is calibrated according to the particular environment in which it is to be used, that is to say, in accordance with a predetermined range of influent pressures, the engineering design of the apparatus, including the volumetric capacity of the vent openings, and the indicating mechanism to be used in conjunction therewith. Trial and error is practiced in order to record most sensitively changes which may occur in the influent condition. This calibration may be readily carried out by one skilled in the art without difficulty by employing influents of known characteristics to predetermine a scale of reference.

The combined mass flow rate of influent flowing through the device is determined according to Equation V, hereinbefore mentioned, where the mass flow rate Q is a function of M and the condition and individual properties of the influent, as described in Equation V. The mass flow rate Q, determined in this manner, may be the total mass flow rate at the source or may be a known fraction thereof, depending upon the manner in which the influent is conducted to the apparatus.

It will thus be apparent that an attendant may, by simply viewing the registering device M, determine immediately the composition of the influent and consequently the condition and character of the source of the influent.

Furthermore the readings at the registering device M will correspond to the conditions in the space to be measured at any particular instant and said readings will automatically and instantaneously vary as the conditions in such space vary. Consequently, there results the giving out of continuous information of the conditions in that space in accordance with either a constant condition or varying conditions therein, as and when they occur, and all this in a thoroughly automatic manner and without any act required on the part of the attendant.

FIG. 2 of the drawings shows a modified form of construction wherein a conversion element, instead of being a chamber 4 as indicated in FIG. 1, takes the form of a diaphragm 11, the margin of which is sealed to the peripheral wall of the dynamic chamber 3. This diaphragm overlies the upper end of the influent passage 5, in spaced relation thereto to provide the intermediate orifice 6. The diaphragm 11, flexible in nature, is secured to a detecting device 10 which, in turn, actuates an indicating device M as in FIG. 1. The structure of FIG. 2 is otherwise as in FIG. 1 and functions in like manner.

In FIG. 3, provision is made for connecting the vent openings 7 to a return line 12, whereby the effluent may be returned to the source of the influent. This return line preferably includes an injector 13, the purpose of which is to eliminate back pressure from the source. With the return line 12 is associated a pressure measuring device $P_2$ which may be utilized to insure that the conditions wherein the device will function are maintained. Other embodiments of this invention may be equipped with similar return lines if so desired.

In the construction of FIG. 4, a bellows 14 is incorporated in the influent passage 5, which bellows may be expanded or contracted, as the case may be, according to the pressure of the influent. The expansion and contraction of the bellows may be noted as registered upon a stationary indicator 14' which may be operated by downward movement of the lower portion 5' of the influent passage, as shown in this figure. In this embodiment the conversion chamber is surrounded by a bellows wall 15 and to the top wall 9 is attached the registering device M, controlled by the expansion or contraction of the bellows 15 depending upon pressure within the conversion chamber 4.

In practice the instrument 14' may be omitted and the registering instrument M may be so calibrated that its reading is based upon a combined movement of the entire housing 1 as provided by the bellows 14, plus the additional expansion of the upper portion of the top wall 9 of the conversion chamber 4, all portions of the passage 5 being fixed, so that the reading at the instrument M will take into account both the pressure and state of the influent.

The construction of FIG. 5 also embodies the peripheral bellows wall 15 with an associated detection device 10 and a registering instrument M as in FIG. 4. The rise and fall of the top wall 9 under varying characteristic pressures within the conversion chamber 4 serve to correspondingly move the partition 2 to increase or decrease the size of the orifice 6, in accordance with the pressures in the conversion chamber. With this arrangement, exactitude of measurement is obtained with relatively small variations in the influent condition.

FIG. 6 illustrates yet another novel feature. Here the post 16 of FIG. 5 is replaced by a bellows 17 which is connected by a flexible by-pass 18 to the influent passage 5. Thus variations in the influent pressure $P_1$ effect movement of the partition 2 to vary the size of the orifice 6, so that pressure $P_1$ constitutes an inherent part of the operating media for the measuring device M.

FIG. 7 illustrates another way of accomplishing the same result as in FIG. 6. Here, instead of the bellows 17 of FIG. 5, a bellows 19, interiorly of the dynamic chamber but in the influent passage 5, serves to cause the raising or lowering of the upper end of said passage 5 to decrease or increase the size of the orifice. The partition 2 is suspended from the top wall 9 of the conversion chamber, as in the previous figures, and this top wall is raised or lowered according to the characteristic pressure within the conversion chamber because of the presence of the bellows wall 15. Thus the size of the orifice 6 is controlled collectively through pressures acting upon the walls, movement of which is permitted by the bellows 19 and 15.

In the structure of FIG. 8, the partition 2 is centrally supported on a thermostatic element in the form of a bi-metallic strip 20 anchored at its opposite ends to the housing 1. This element serves to raise or lower the partition 2 with consequent variation of the size or the orifice 6, in accordance with temperature to which said element 20 is subjected.

I have hereinbefore stated that the casing 1, as well as the other mechanical elements which constitute the present invention may be of different shapes and forms. These may widely vary without departing from the invention and FIGS. 9-14 illustrate schematically some additional embodiments to which are applied reference characters corresponding to those used in the preceding figures.

The structure of FIG. 9 differs from the structure of FIG. 1 only in that the influent passage 5 terminates at the bottom wall of the housing 1 so that the orifice 6 is formed between the upper end of said influent passage 5 and the partition 2. Both structures otherwise operate in the same manner.

FIG. 10 is the same in structure as FIG. 1, except that the influent passage 5 is off-center and only a single vent 7 is shown.

FIG. 11 shows a structure the same as FIG. 9, except that the influent passage is off-center.

FIG. 12 is the same as FIG. 1, except that the partition 2 is provided with a depending peripheral skirt.

Figure 4:
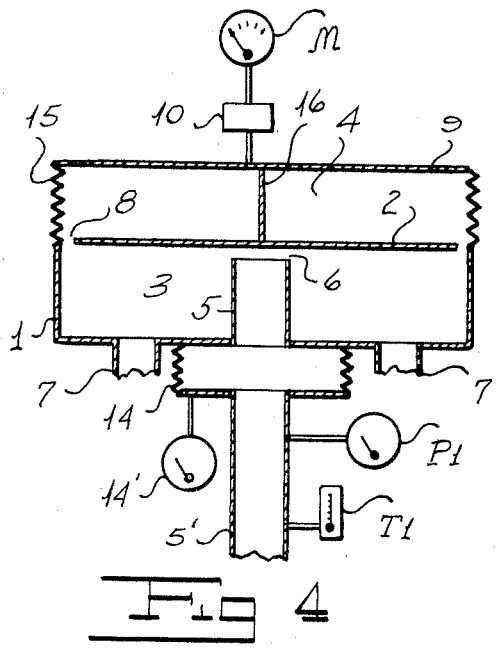
Figure 5:
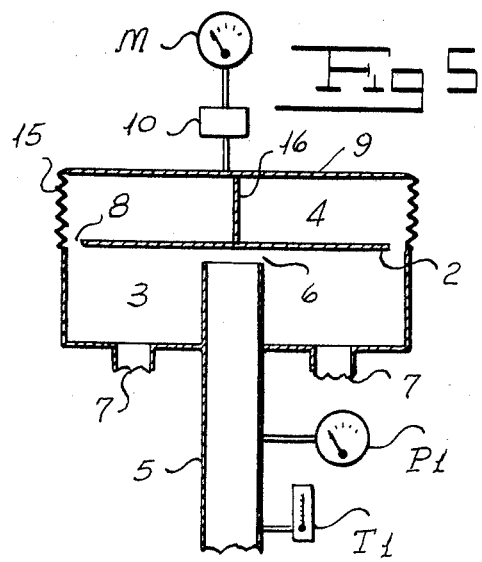
Figure 6:
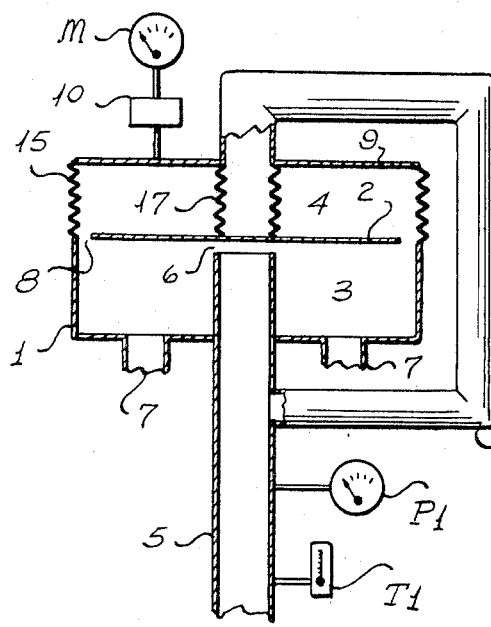
Figure 7:
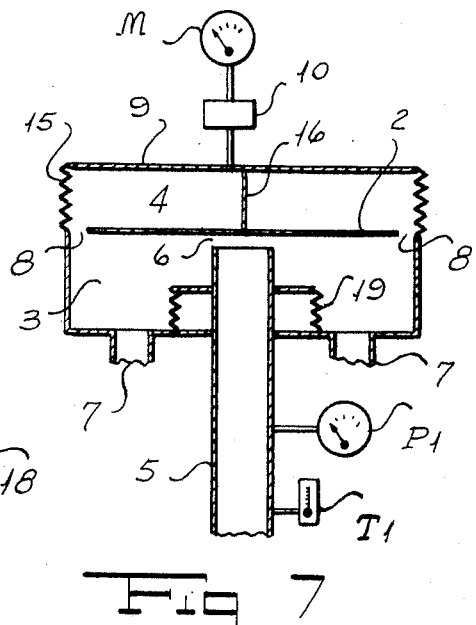

FIG. 13 simply shows a variation in shape of the individual parts of the structure and the same is true of FIG. 14.

The present invention may be used for many purposes. For example, it has heretofore been the practice to automatically regulate conditions in many processes by control systems known as "open loop" or "closed loop" systems. These systems incorporate an automatic controller which, usually by gas pressure, activates the mechanism controlling the condition. This gas pressure is regulated by a flapper acting against the outlet of a pair of tandem nozzles such, for example, as indicated at 22 in FIG. 15, one commercial form of which is illustrated in Philbrick et al., Patent No. 2,445,335, dated July 20, 1948. In practice the flapper functions in conjunction with an incoming impulse engendered by the conditions to be controlled. My invention may be utilized in lieu of the flapper, to control the conditions of quality of phase distribution which heretofore have been impossible of accomplishment.

As shown in FIG. 15, the movable top wall 9 of the housing 1 serves the function of the flapper heretofore employed. Alternatively, a flapper, such as heretofore used, may be employed and said flapper activated in accordance with the present invention.

In the foregoing figures of the drawings, the respective parts are shown in diagrammatic manner, but it will be understood by those skilled in the art that these various parts may be fabricated structurally to embody like structural elements and relationship, functioning in the manner hereinbefore described.

The foregoing detailed description sets forth the invention in its preferred practical forms, but the invention is to be understood as fully commensurate with the appended claims.

Having thus fully described the invention, what I claim as new and desire to secure by Letters Patent is:

1. The herein described method which comprises the following steps, namely:
    (a) causing an influent to flow into and be expanded in a dynamic chamber through an inlet opening in which its velocity is characteristic of the phase condition of the influent,
    (b) directing a portion of said influent in the dynamic chamber through an opening into a conversion chamber to autogenously convert unmeasurable energy in the dynamic chamber into measurable energy in the conversion chamber, while venting other portions of such influent from the dynamic chamber, and
    (c) measuring the resulting energy in the conversion chamber to indicate the characteristics of the influent.

2. Method according to claim 1, wherein the energy thus measured is in terms of pressure.

3. Method according to claim 1, wherein the energy thus measured is in terms of temperature.

4. Method according to claim 1, wherein the opening into the dynamic chamber is a constricted opening.

5. The method according to claim 1, which comprises determining the pressure of the influent prior to its entry into the dynamic chamber.

6. The method according to claim 1, which comprises determining the temperature of the influent prior to its entry into the dynamic chamber.

7. An apparatus to determine a characteristic of a multiphase mixture which comprises:
    (a) a dynamic chamber having an inlet passage which terminates in a constricted opening, means in said chamber providing a vent which restricts the outflow of fluid to the atmosphere;
    (b) a second chamber communicating with said dynamic chamber, said second chamber being a substantially no-flow chamber;
    (c) means in communication with said second chamber to measure the energy in said second chamber and thereby to indicate a characteristic of the multiphase mixture.

8. An apparatus according to claim 7, comprising means for measuring the temperature of the influent flowing through said passage leading to the dynamic chamber.

9. An apparatus according to claim 7, comprising means for measuring the pressure of the influent flowing through said passage leading to the dynamic chamber.

10. An apparatus according to claim 7, wherein the dynamic and second chambers are separated by a partition provided with an opening through which the influent may pass from the dynamic chamber to the second chamber.

11. An apparatus according to claim 10, wherein the partition is substantially flat.

12. An apparatus according to claim 7, wherein the dynamic and second chambers are separated by a partition of substantially conoform shape, the wall of the dynamic chamber being of like shape and peripherally spaced from the partition to form the dynamic chamber between the partition and said wall.

13. An apparatus according to claim 7, wherein the peripheral wall of the second chamber constitutes a bellows which permits movement of the wall supported by said bellows to actuate the means for indicating the characteristics of the influent.

14. An apparatus according to claim 7, wherein the influent is fed into the dynamic chamber from the feed passage through a constricted opening, and a bellows is incorporated in the feed passage for automatically controlling the volumetric discharge of the influent from said passage into the dynamic chamber.

15. An apparatus according to claim 7, comprising a source from which the influent is fed to the dynamic chamber, and a return connection from the vent opening of the dynamic chamber to said source.

16. An apparatus of the character described which comprises:

(a) dynamic and second chambers separated by a partition, said dynamic chamber having a vent, (b) a passage for feeding influent into the dynamic chamber through an orifice interposed between said passage and said partition, (c) a bellows forming the lateral wall of the second chamber for permitting movement of the end wall which the bellows supports toward and away from the influent passage, (d) indicating means connected to said movable wall and operable by the movement thereof, (e) a second bellows fixed to the movable wall and supporting said partition to effect volumetric regulation of said orifice in accordance with the pressure in the second chamber, and (f) a conduit connecting the interior of said second bellows to said influent passage.

17. An apparatus according to claim 7, wherein the influent passage and the vent opening of the dynamic chamber are both positioned off center of said chamber.

18. Apparatus according to claim 7, wherein the dynamic chamber and the second chamber are separated by a partition from which the vent opening and the inner end of the influent passage are substantially equidistantly spaced.

References Cited by the Examiner
UNITED STATES PATENTS

| | | | |
|---|---|---|---|
| 2,445,335 | 7/1948 | Philbrick et al. | 73—388 |
| 2,780,938 | 2/1957 | Chamberlain | 73—194 |
| 3,056,282 | 10/1962 | Boyd | 73—53 |

LOUIS R. PRINCE, *Primary Examiner.*

DAVID SCHONBERG, RICHARD C. QUEISSER, ROBERT L. EVANS, *Examiners.*